United States Patent [19]
Oswald

[11] Patent Number: 4,830,781
[45] Date of Patent: May 16, 1989

[54] TIRE BODY REINFORCING COMPONENT AND APPARATUS AND METHOD FOR PRODUCING SAME

[75] Inventor: Richard W. Oswald, Madison, Conn.

[73] Assignee: The Armstrong Rubber Company, New Haven, Conn.

[21] Appl. No.: 99,111

[22] Filed: Sep. 18, 1987

[51] Int. Cl.⁴ .................. B60C 9/10; B60C 9/12; B65H 54/08; B65H 81/08

[52] U.S. Cl. .................. 152/530; 152/548; 152/560; 152/563; 156/173; 156/446; 249/65

[58] Field of Search .............. 152/563, 527, 530, 533, 152/538, 539, 548, 550, 552, 560, 556, 554, 562; 156/172, 173, 446, 397; 428/293, 294, 295; 249/65

[56] References Cited

U.S. PATENT DOCUMENTS

| | | | |
|---|---|---|---|
| 522,814 | 7/1894 | Welch | 152/549 |
| 610,310 | 9/1898 | Sloper | 152/562 |
| 649,720 | 5/1900 | Duryea | 152/563 |
| 1,328,006 | 1/1920 | McLeod | 152/562 |
| 1,461,984 | 7/1923 | Pfeiffer | 152/562 |
| 1,603,857 | 10/1926 | Midgley | 156/397 |
| 2,352,055 | 6/1944 | Witt | 156/397 |
| 2,982,327 | 5/1961 | Vanzo et al. | 152/361 |
| 3,139,135 | 6/1964 | Frisby | 152/563 |
| 3,275,056 | 9/1966 | Menell | 156/562 |
| 3,310,093 | 3/1967 | Frazier | 152/533 |
| 3,327,753 | 6/1967 | Travers | 152/356 |
| 3,496,984 | 2/1970 | Boileau | 152/562 |
| 3,550,667 | 12/1970 | Bartley et al. | 152/361 |
| 3,568,749 | 3/1971 | Menell et al. | 152/562 |
| 3,589,426 | 6/1971 | Varner | 152/530 |
| 3,598,166 | 8/1971 | Wells | 152/361 |
| 3,605,849 | 9/1971 | Boileau | 152/562 |
| 3,674,079 | 7/1972 | Varner | 152/361 |
| 3,748,203 | 7/1973 | Greene | 156/397 |
| 3,782,441 | 1/1974 | Boileau | 152/562 |
| 3,783,925 | 1/1974 | Boileau | 152/562 |
| 3,935,894 | 2/1967 | Pouilloux | 152/552 |
| 3,977,614 | 8/1976 | Hardwick | 156/446 |
| 4,145,740 | 3/1979 | McClean et al. | 364/469 |
| 4,600,456 | 7/1986 | Oswald | 156/117 |

Primary Examiner—Willard Hoag
Attorney, Agent, or Firm—St. Onge Steward Johnson & Reens

[57] ABSTRACT

A tire body reinforcing component is provided for underlying the tread and at least the sidewall regions of a pneumatic tire. The component comprises at least one continuous cord disposed across the width of said component from one edge to the other thereof. The component forms at least one tread section for underlying the tread region and extending along the circumferential direction of the tire wherein said continuous cord is disposed in a generally zig-zag pattern and is positioned across the width of said tread section at an angle to the edges of said component. The lengths of said cord in said tread section are interleaved with lengths disposed at an opposite angle to the edge of said component along at least one line substantially parallel to and intermediate the edges of said component. Also provided is a method for producing the tire body reinforcing component.

21 Claims, 4 Drawing Sheets

TIRE BODY REINFORCING COMPONENT AND APPARATUS AND METHOD FOR PRODUCING SAME

DESCRIPTION

1. Technical Field

The present invention relates to woven, endless tire body reinforcement components.

The typical tire has separate belt and body plies. The belt ply underlies and reinforces the tire tread, while the body ply underlies and reinforces the remainder of the carcass, such as the tire sidewalls and beads.

With respect to the belt ply, endless reinforcement belts are woven from coated continuous reinforcement material by laying it in an ordered zig-zag pattern on the surface of a forming drum. The endless belt is then removed or doffed from the forming drum and used to reinforce that portion of the pneumatic tire that comprises the tread portion.

The endless belt underlies only the tread portion of the tire. A separate body ply or plies reinforce the remainder of the tire carcass.

The present invention replaces the multiple belt and body plies with a single woven component that is woven from at least one, and preferably two, continuous cord reinforcements or strips. A continuous, woven, endless tire body reinforcing component is therefore provided not only for underlying the tread portion of a pneumatic tire, but also for underlying the sidewall and bead portions of the tire.

2. Background Art

Pneumatic vehicle tires with carcass reinforcements that extend from one bead to another in the tire are shown in the prior art.

U.S. Pat. No. 3,568,749 to Menell et al. shows such a carcass reinforcement of substantially parallel strength members that pass in one piece from bead to bead. Those portions of the strength members which extend from bead to bead are looped around the beads and extended back into the shoulder areas of the tire. As seen in FIGS. 1 and 2 of Menell et al., the bead-to-bead reinforcing members are cut off, with ends 11 being looped around the bead back into the shoulder area. Between the thread sections 8 and ends 11 are provided belt layers 12 extending substantially over the width of the tread strip 2. It can be seen from FIG. 2 that the various belt reinforcements are built up from parallel reinforcement members laid primarily side by side and cut off or trimmed to the apprpopriate lengths or widths.

U.S. Pat. No. 3,275,056 to Menell also shows carcass reinforcement layers extending from bead to bead in which each carcass layer has parallel cords extending within the tire walls at approximately a right angle with respect to the circumferential direction of the tire and below the tread strip at an incline with respect to the circumferential direction of the tire. As seen most clearly in FIG. 2 of Menell, two carcass layers made up of parallel cords overlie each other, with the threads passing around the bead cores and the folded back ends positioned adjacent the bead areas.

U.S. Pat. No. 1,328,006 to McLeod discloses a cord tire skeleton where loops are formed at the margins of a cord web. An outer ply element and inner ply element thereof is illustrated at FIG. V. The skeleton is built by forming a cord web having diagonal cord elements with loops at the end. Then a cord web is formed having its cord elements inclined oppositely to the first mentioned cord elements, also with loops at the end. The outer cord web overlies the inner cord web.

U.S. Pat. No. 1,461,984 to Pfeiffer shows a pneumatic tire casing embodying a plurality of cords the body portions of which are extended in approximately parallel relation across the tread, the ends of adjacent cords being crossed on each other and being inclined with respect to the body portion in opposite directions. The construction of the device is said to be such that the casing will have a yieldable tread portion and relatively rigid side portions.

U.S. Pat. No. 3,589,426 to Varner shows an endless reinforcement for a pneumatic tire comprising continuous cord forming a generally zig-zag pattern and being positioned across the width of the reinforcement with reversals at the edges. The parameters of the strip are $$\frac{C \cdot \tan \cdot A}{2 \cdot W} = \frac{EPI \cdot C \cdot D \cdot \sin A}{P \cdot M \pm 1} = GR$$

wherein C is the circumference of the reinforcement, A is the smaller angle between the cord and the edge of the reinforcement, W is the width of the reinforcement measured perpendicular to the edges, EPI is the number of cords per inch measured perpendicular to the cord lengths, P is an integer and equal to one plus the total number of interleaving lines parallel to and intermediate the edges of the reinforcement, M and D are two integers having no common factor and which render P·M!1/D an integer with D being less than P, and D and P have no common factor, and GR is the number of repeating cycles of the cord from one edge and back to the same edge for each circumference of the reinforcement. As shown in FIG. 3 of Varner, the reinforcement 21 is disposed within the carcass between the tread 22 and the carcass plies 23.

DISCLOSURE OF INVENTION

In accordance with the present invention, there is provided a tiee body reinforcing component for underlying the tread, sidewalls, and beads of a pneumatic tire. The component is woven from at least one continuous cord. Also provided is a method for making such a component.

The invention in its broad aspects comprises a component woven from at least one continuous cord. The component has at least one tread section extending along the circumferential direction of the tire and formed from a generally zig-zag positioning of cord lengths across the width of the tread section. The tread section is for underlying the tread of the pneumatic tire. The tread section is flanked along both sides by sidewall sections integrally formed by weaving from the same continuous cord lengths wherein the cords lie substantially parallel to each other and perpendicular to the circumferential direction of the tire. The tread and sidewall sections are further flanked beyond the sidewall sections by bead sections formed by the same continuous cord being looped during the process of weaving in reversals at the edges of the component.

The method of the present invention comprises forming continuous cord in a woven pattern across the width of said component from one edge to the other thereof in accordance with the steps of forming cord lengths in a tread section in a generally zig-zig pattern across the width of said tread section from one side to the other at an angle to the edges of said component, the lengths of said cord between the sides of said tread section being interleaved with lengths disposed at an opposite angle to the edges of said component along at least one line substantially parallel to and intermediate the sides of said tread section; further integrally forming from said continuous cord two sidewall sections, each section flanking said tread section along both sides thereof, cord lengths in said sidewall sectons being positioned substantially parallel to each other across the sidewall section and substantially perpendicular to the circumferential direction of the tire; and further forming said bead section by looping cord lengths in reversals at the edges of said component.

It is an object of the present invention to provide an improved tire body reinforcing component that is integrally woven from at least one continuous reinforcement cord.

It is a further object of the present invention to provide an improved tire body reinforcing component that has the strength associated with woven belts in the tread region, while reducing any increase in woven belt thickness at the edges of the tread region.

It is a further object of the present invention to provide an improved tire body reinforcing component that underlies the tire carcass from bead to bead, is continuous and woven, and provides for increased strength in the bead area.

It is a further object of the present invention to provide a tire body reinforcing component to improve tire quality by reducing any variability in placement of multiple belt and body sections at assembly.

It is a further object of the present invention to provide a body reinforcing component that eliminates body and belt section splices.

It is a further object of the present invention to provide a method for forming a tire body reinforcing component that is endless, continuous, and woven for underlying the tire carcass from bead to bead.

BRIEF DESCRIPTION OF THE DRAWINGS

The invention will be better understood and its advantages will become more apparent when the following detailed description is read in light of the accompanying drawings herein.

DETAILED DESCRIPTION OF THE INVENTION

Endless woven tire body reinforcement components of the type of the present invention find utility in virtually all vehicle pneumatic tires. One of the widest uses is in passenger car tires of otherwise conventional construction.

Figure 1:
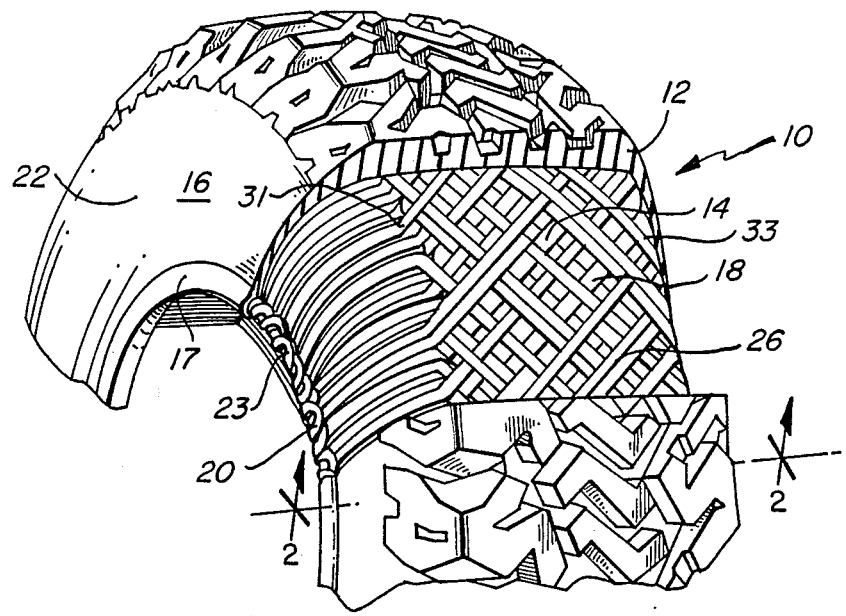
FIG. 1 is a perspective view of a tire, partially broken away to show a tire body reinforcing component made according to the present invention in place in a tire.

The perspective drawing of FIG. 1 shows such a tire 10 with a portion of tread 12, one sidewall 16, and one bead 17 thoroughly removed to show the component 14 of the present invention positioned inside tire 10. As seen in conjunction with FIG. 2, the component 14 comprises a tread section 18, left and right sidewall sections 20 and 21, and left and right bead sections 23 and 25. Teead section 18 underlies the tread 12 of the tire, sidewall sections 20 and 21 underlie the sidewalls 22 and 24 of tire 10, and bead sections 23 and 25 udderlie the beads 17 and 29 of tire 10. FIG. 1 shows the bead 23 turned up around the tire bead 17 to provide additional reinforcement in this area. It is understood that the terms "right" and "left" are used for convenience only and are not intended to limit the scope of the present invention.

Figure 2:
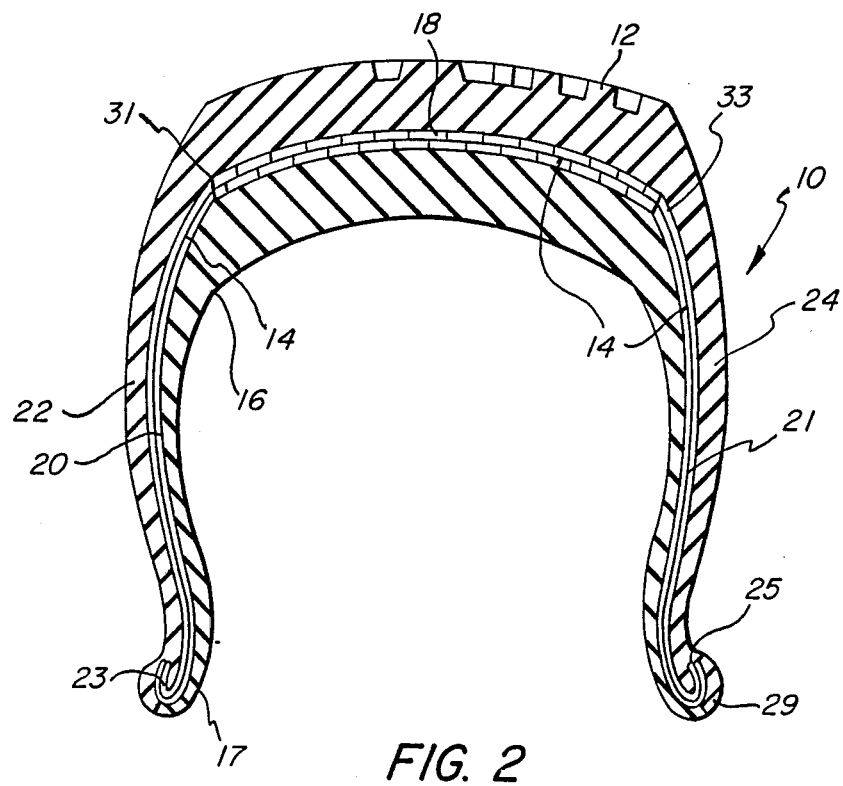
FIG. 2 is a partial sectional view taken along line z—z in FIG. 1.

The partial sectional view of FIG. 2 taken along line z—z of FIG. 1 shows the component 14 of the present invention in place in the tire body. It can be seen in FIG. 2 that the component 14 of the present invention substantially reduces any increase in belt thickness that typically occurs with a woven belt, such as that shown in U.S. Pat. No. 3,589,426 to Varner, at the edge or shoulder regions 31 and 33. Because the terminating edges of the woven belt are now in the bead area instead of the shoulder regions, there are no reversals at the shoulder in the present invention, in that there is no cord buildup in the shoulder regions. Rather, the cord buildup now occurs at the beads. This permits for enhanced strength in the bead area where it is needed, not in the shoulder areas where it can be disadvantageous.

The component 14 of the present invention could also be woven to have a sufficient buildup of material in the bead area to also serve as the beads. This embodiment is described in more detail below.

Referring back to FIG. 1, it can be seen that the tire body reinforcing component 14 of the present invention has a substantially zig-zag pattern for the cord lengths forming the tread section 18 underlying the tread, while having cord lengths that lie substantially parallel to each other in the sidewall region 20. The woven endless tire body reinforcing component in the tread section 14 is composed of a number of coated continuous cord lengths 26 disposed in a zig-zag repeating pattern with succeeding lengths of the strips being displaced from each other. The cord lengths are interleaved with lengths of cords disposed at an opposite angle along at least one line substantially parallel to and intermediate the sides of the tread section. This interleaving relationship results in a woven structure.

It is understood that the component of the present invention is woven from at least one, and preferably two, endless cord reinforcements or strips 36 and 36' that are laid back and forth from edge to edge of the component in varying patterns depending upon the lateral position within the component. Therefore, it is useful to talk about lengths of cord to describe how the cord is laid down at various points in the component. Each cord length is, however, only a portion of the endless cord or cords that are integrally woven to form the component.

The individual continuous cord reinforcements 36 and 36' are typically comprised of one or more tire cord strands embedded in or coated with a suitable rubber or other polymeric material. The cord may be of such materials as fiberglass, rayon, polyester, Aramid, nylon, cotton, steel, other metal or similar types of cords. Preferably, the coated continuous cord reinforcement will contain a single cord spaced within a rubber coating, although a plurality of parallel cords spaced evenly within a rubber coating could also be used.

The component of the present invention is preferably formed by supplying cord lengths 26 to an endless weaving surface in an appropriate pattern. The endless weaving surface can be any suitably shaped drum, weaving belt, or bladder with any appropriate means for doffing. The weaving of tire reinforcing belts generally is known in the art by moving weaving heads supplying cord to the surface in timed relationship to the movement of the surface. For example, U.S. Pat. No. 4,600,456 to Oswald illustrates generally how a belt for reinforcing the tread is woven by supplying reinforcement cords in a predetermined pattern to an endless weaving surface. U.S. Pat. No. 3,589,426 to Varner also shows the basic method of weaving continuous belts from two continuous cords on an endless weaving surface.

Figure 3:
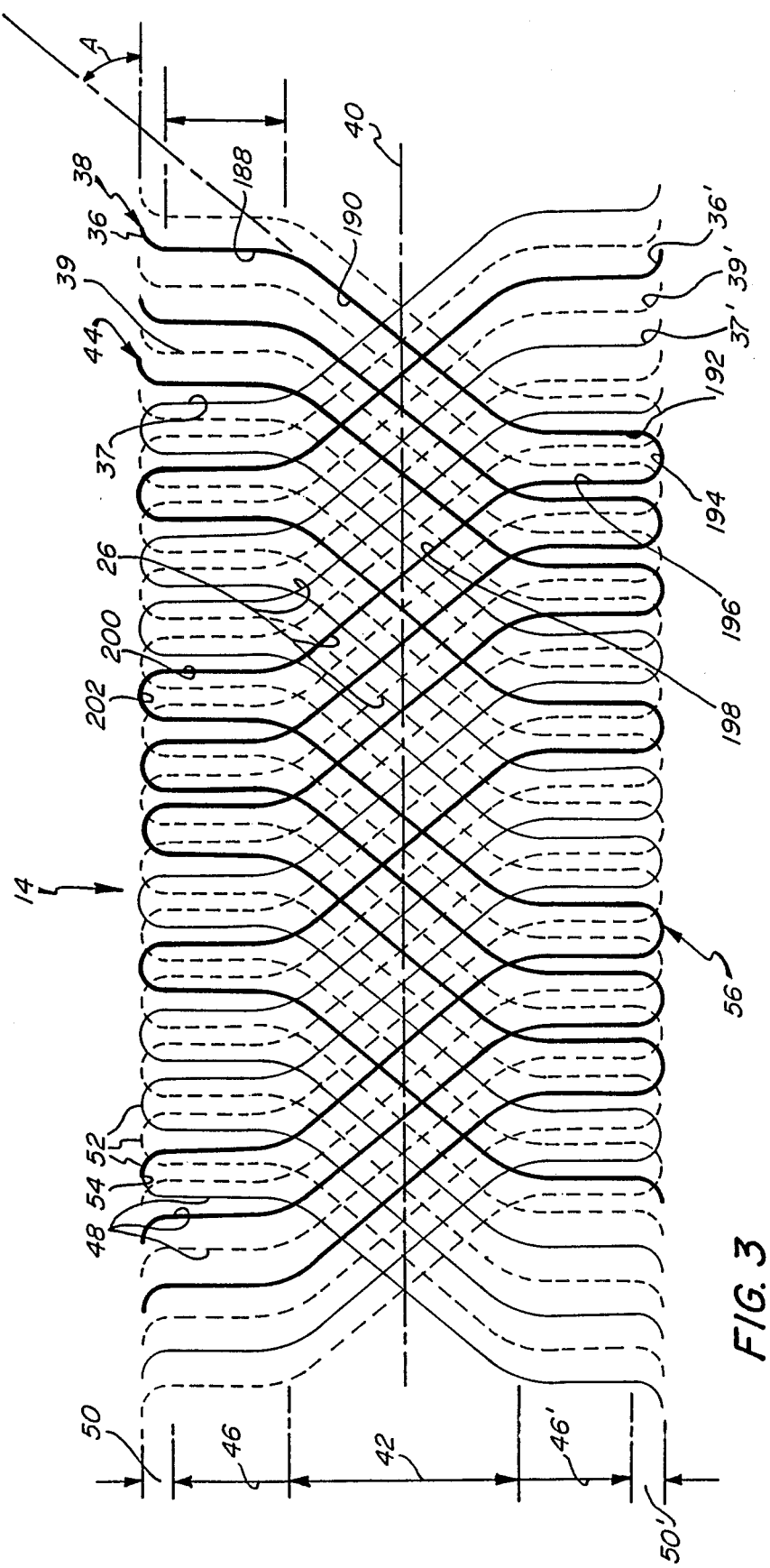
FIGS. 3, 3A, 3B, and 3C are schematic representations of top views of sections of various tire body reinforcing components of the present invention, substantially as the components would appear from a top view at a relatively early stage in the course of production.

The weaving pattern for the reinforcing component of the present invention is shown in more detail in FIG. 3, wherein the component of the present invention is shown in a top view substantially as it would appear in a top view at a fairly early point in the course of production if the endless component were cut in two and stretched out along a plane. The cord lengths 26 are represented by single heavy lines 36 and 36' for the sake of clarity. Lighter lines 37 and 37' and dotted lines 39 and 39' are continuations of 36 and 36' several cycles later. FIG. 3 shows a top view of the woven combined body and belt section of the present invention flat with two cord reinforcements 36 and 36' for illustration at a fairly early stage of production. It is understood that one or more cords can be used to weave the component of the present invention.

Figure 3B:
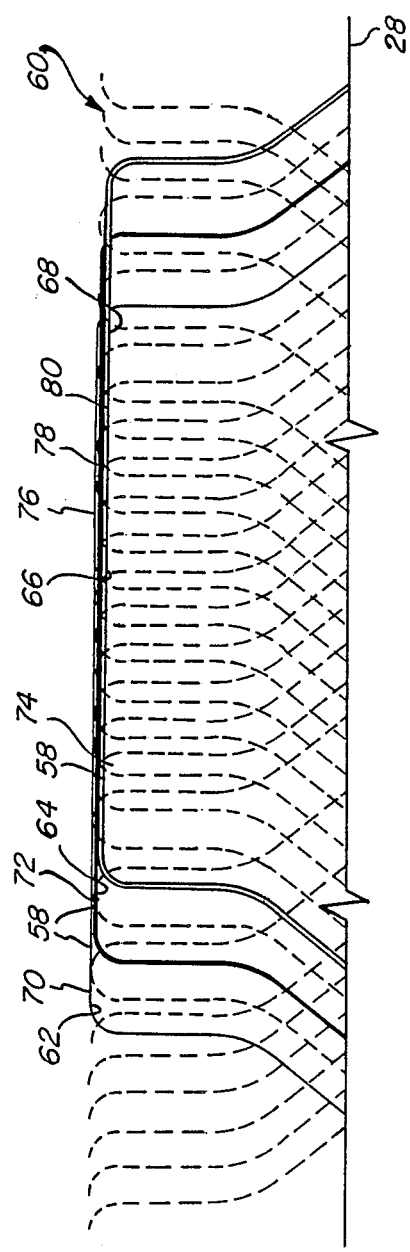
Figure 3A:
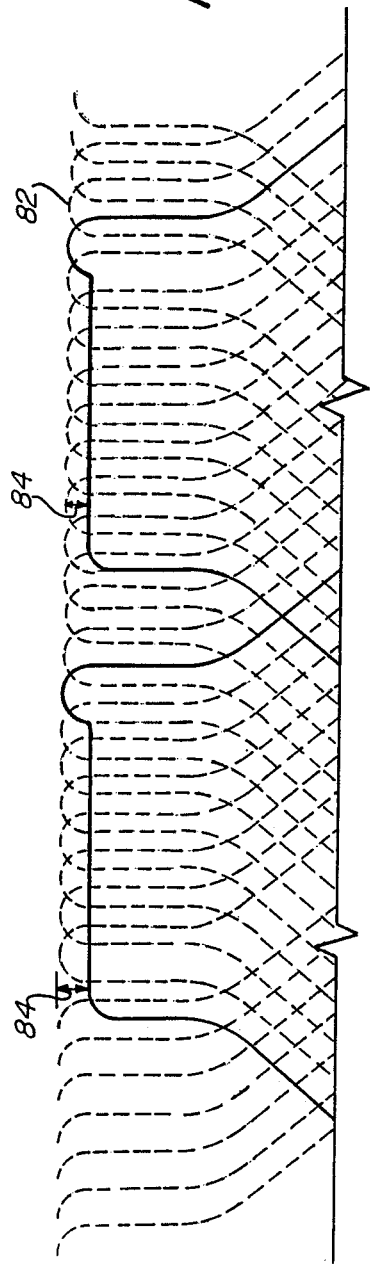
Figure 3C:
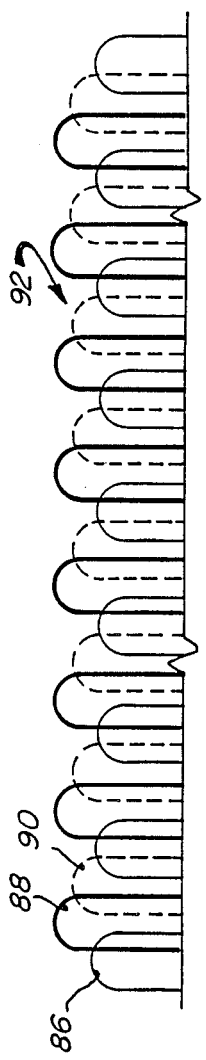

The top views of FIGS. 3, as well as FIGS. 3A, 3B, and 3C, are shown here for the sake of simplicity and ease of understanding. In reality, the component is preferably neither woven on a flat weaving surface, nor is it woven to lie in one plane. This is because a flat component, when bent to fit around a tire carcass as shown in FIG. 1, would be distorted. For example, when formed around the carcass, the parallel cord lengths would no longer lie parallel to each other, because such cord lengths in the sidewall would be compelled to lie radially rather than parallel. Such cord lengths would therefore be more closely spaced towards the center of the tire.

Accordingly, the component of the present invention is woven on a shaped weaving surface that more nearly represents the configuration the component will assume once placed in a tire. This weaving surface is disclosed in FIGS. 4A and 4B and discussed below in more detail. However, for purposes of disclosing the cord pattern, it is helpful to consider only a top view of the component that would be seen if the component were removed from the shaped weaving surface and extended lengthwise along a plane. It is to this top view that FIGS. 3, 3A, 3B, and 3C and the corresponding text are now directed.

The component 14 of the present invention is woven along a centerline 40, which extends substantially in the circumferential direction of the component 14, which also corresponds to the circumferential direction of the tire in which the component is to be used. The tread section of the belt, the width of which is denoted by figure number 42, functions substantially like the belt section of the prior art and is substantially centered in component 14 where the cord lengths are interwoven in a zig-zag pattern. The preferred zig-zag pattern here is such as that disclosed in the '749 or '456 patents, wherein the parameters are $$\frac{C \cdot \tan A}{2 \cdot W} = \frac{EPI \cdot C \cdot D \cdot \sin A}{P \cdot M \pm 1} = GR$$

wherein C is the circumference of the reinforcement, A is the smaller angle between the cord length and the edge 44 of the reinforcement, W is the width 42 of the reinforcement measured perpendicular to the edges, EPI is the number of cord lengths per inch measured perpendicular to the cord lengths, P is an integer and equal to one plus the total number of interleaving lines parallel to and intermediate the edges of the component, M and D are two integers having no common factor and which render P·M!1/D an integer with D being less than P, and D and P have no common factor, and GR is the number of repeating cycles of the cord lengths from one edge 44 and back to the same edge 44 for each circumference of the reinforcement.

The tread section 42 is flanked on either side by sidewall sections, indicated by figure number 46 and 46'. In the sidewall sections the cord lengths 48 are laid substantially parallel to one another, without substantial interleaving, and are substantially perpendicular to the circumferential direction of the tire.

Tread section 42 is further flanked by bead sections 50 and 50', adapted to underlie the beads of the tire 10. The sidewall sections 46 and 46' separate the bead sections 50 and 50' from the tread section 42. In the bead sections, the cord lengths 52 loop around in reversals 54 back towards the centerline 40 and the opposite edge 56. This looping at the edges 44 and 56 of the component tends to cause accumulation or build-up of cord reinforcement material at the edges, thereby adding additional strength at these edges.

FIG. 3A shows a top view of one side of another preferred embodiment, wherein additional cord material 58 is intentionally deposited adjacent the edge 60 of said component to increase buildup of cord material in this area, thereby resulting in reinforcement of the component adjacent the edge for additional strengthening of the bead region of the tire.

By reference to FIG. 3A, it can be seen that the edge 60 is formed to include successive loops or reversals 62, 64, and 66 of cord. The amount of cord material deposited adjacent the edge 60 can readily be changed by corresponding changes in the dwell of the weaving heads in the bead regions. For example, if the weaving head is caused to dwell for a longer period of time adjacent the edge 60, then a length of cord 68 will be deposited parallel to the circumferential direction of the component. This is illustrated by figure number 68 in FIG. 3A, denoting such a parallel length of cord 68 on one bead. In other words, it can be seen that each of the loops 62, 64, and 66 has at least one reversal 70, 72, and 74 wherein an end length 76, 78, and 80 of cord extends substantially in the circumferential direction of the component, or parallel to axis 28. At least selected ones of end lengths for selected loops can be extended in the circumferential direction by increasing weaving head dwell at the edges. Not all loops need be so extended or widened, only selected ones, such as for example 62, 64, and 66. This results in the buildup of cord material for substantial reinforcement in the bead areas. Thus, a plurality of cord lengths are positioned substantially parallel to the circumferential direction of the component adjacent the edges. This cord buildup can be so substantial as to create the beads themselves and eliminate the need for the usual wire hoop typically forming the beads.

FIG. 3B shows another preferred embodiment wherein the cord reinforcement buildup or positioning of cord lengths parallel to the circumferential direction occurs not on the edge 82 itself, but rather back from the edge a preselected distance or distances 84. Thus, the stiffness of the component in the bead region can be adjusted depending upon how close to the edges the cord material buildup is permitted.

FIG. 3C shows an embodiment wherein the loops 86, 88, and 90 are not all disposed or aligned together. This is desirable, because there can be forces or stresses associated with the edge 92 of the component that are more concentrated when all the loops terminate along the same line, such as that shown in FIG. 3. The scalloped appearance of FIG. 3C tends to have the beneficial effect of distributing these forces over a larger area, thereby diminishing the likelihood of tire failure in the bead regions.

Figure 4A:
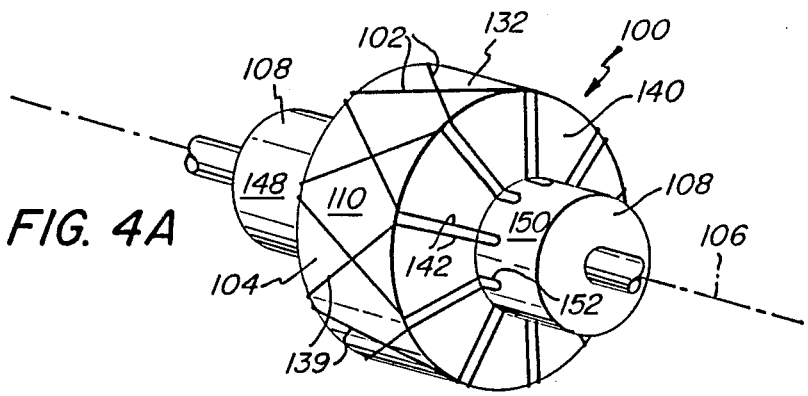
FIG. 4A is a perspective drawing of a particularly preferred shaped weaving surface for weaving the component of the present invention.

With reference now to FIG. 4A, a more detailed description of the preferred apparatus for weaving the component 14, includes a shaped endless weaving surface, and the preferred method of weaving the component 14 of the present invention is given. As explained above, the component 14 of the present invention is desirably woven on a weaving surface 100 that more closely approximates the shape of a tire carcass than does the flat surface associated with the typical cylindrical weaving surface or weaving belt. FIG. 4A shows the weaving surface 100 of the present invention in perspective, with lines 102 thereon indicating how the cord would be laid on the surface. For the sake of clarity, the weaving heads themselves are not shown in FIG. 4A, but it is understood that the weaving heads used in conjunction with the shaped weaving surface 100 of FIG. 4A would need the ability not only to weave back and forth across the surface 100, but also in and out along the sloped portions of the surface 100. In other respects, the weaving heads are positioned with respect to the weaving surface in substantially the same manner as that shown in the '456 patent.

Returning to the preferred weaving surface 100 of FIG. 4A, it is seen that a toroidal shaped surface 104 having a shape corresponding to the surface of rotation generated by rotating a trapezoid about the cylinder axis 106 is mated with a cylindrical weaving surface or drum 108. This trapezoidal cross-sectional shape is preferably obtained in practice by mounting a shaped reinforced bladder 110 over the cylindrical drum 108 as shown. The bladder 110 can be expanded or contracted by inflation or deflation to doff the component woven on the surface thereof. Lines 102 represent the cords laid on the weaving surface by the weaving heads at a very early stage of production.

Figure 4B:
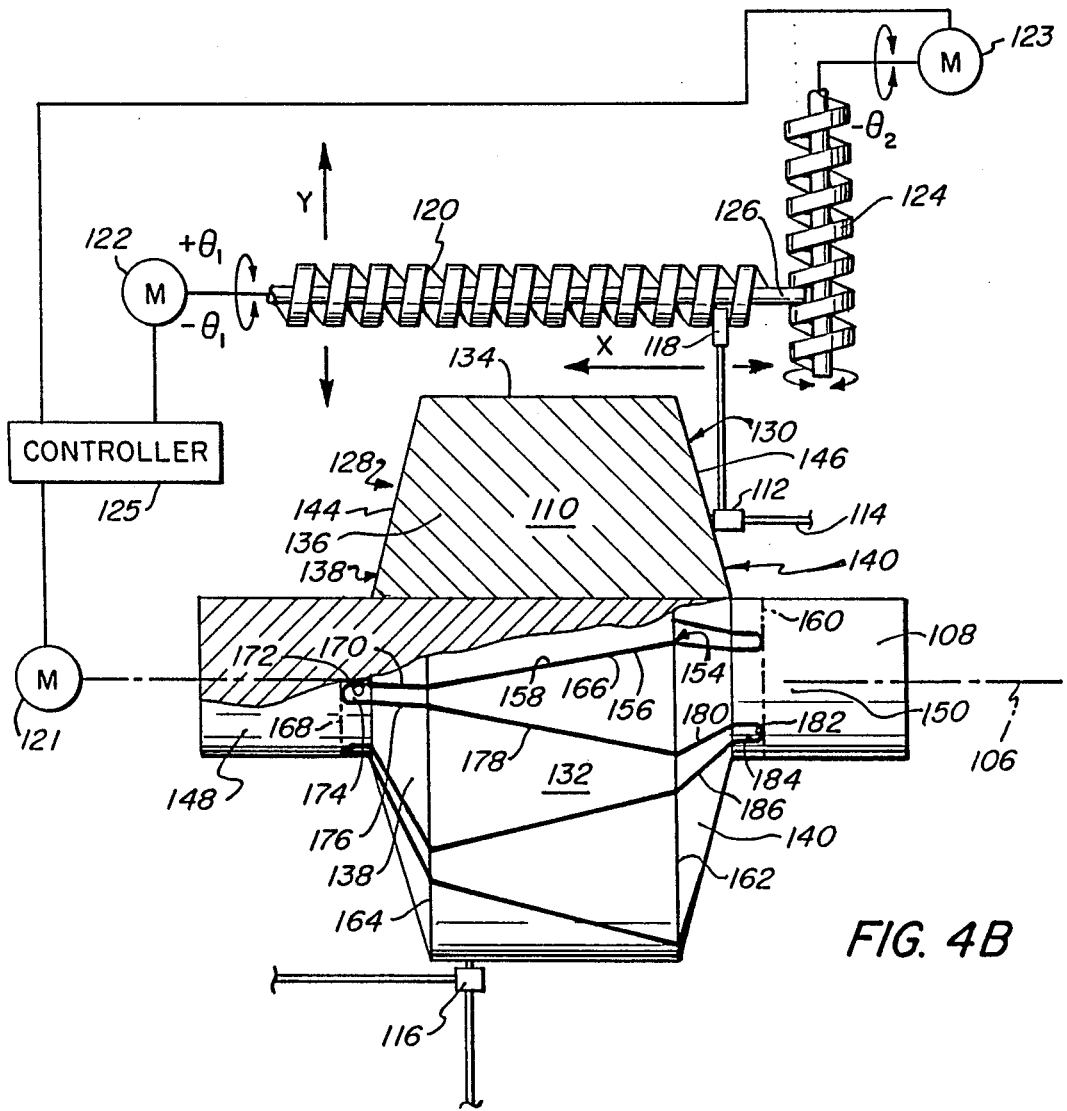
FIG. 4B is a side view with partial cross section of the weaving surface of FIG. 4A.

FIG. 4B provides a further illustration of the shaped weaving surface 100 preferably used in the present invention. Surface 100 is rotated by motor 121. In FIG. 4B, weaving surface 100 is shown in conjunction with a schematic representation of the weaving heads. FIG. 4B shows a side view in partial cross section, wherein the shaped bladder is indicated at 110 as being positioned on drum 108. The trapezoidal cross section of bladder 110 is readily seen in FIG. 4B. It can also be seen how the raised portion of trapezoidal cross section approximates the cross sectional shape of tire 10.

The schematic representation of the weaving head operation is shown for only one weaving head 112 for the sake of clarity. Weaving head 112 supplies cord 114 to surface 100. It is understood that this is a conceptual representation only of one way of achieving the desired result, and that the other weaving head, shown only in outline form at 116, operates in a substantially mirrored relationship as explained in the '456 patent. Weaving head 112 achieves the back and forth, or reciprocating motion, by being coupled with a ball nut 118 that rides along a ball screw 120. Ball screw 120 is repeatedly rotated or cycled back and forth by a suitable motor 122 an angular displacement of first $+\theta_1$ and then $-\theta_1$ to cause the ball nut 118 and thus the weaving head 112 to reciprocate in the X direction. The in and out motion, or Y motion, is accomplished by coupling ball screw 120 with a second ball screw 124 disposed at a right angle thereto for the Y motion. Ball screw 124 is repeatedly rotated or cycled back and forth by a suitable motor 123 an angular displcement of first $+\theta_2$ and then $-\theta_2$ to cause the ball nut 126 and thus ball screw 120 and weaving head 112 to reciprocate in and out in the Y direction for weaving on the sloped areas 128 and 130 of weaving surfcce 100. Suitable control means 125 are employed to operate motors 121, 122, and 123.

With reference to FIG. 4B, it is seen that a plurality of weaving areas are provided. A first weaving area 132, which corresponds to the surface of rotation of the minor leg 134 of the trapezoid 136, provides a cylindrical surface for reception of the cord lengths forming the tread section, wherein the cord lengths 139 lie in a zigzag pattern substantially defined by the formula $$\frac{C \cdot \tan \cdot A}{2 \cdot W} = \frac{EPI \cdot C \cdot D \cdot \sin A}{P \cdot M \pm 1} = GR$$

The weaving on weaving area 132 is carried out substantially as described in '456 patent to Oswald.

Second weaving areas 138 and 140, flanking area 132, are provided for receiving the cord lengths 142 forming the sidewall sections right and left. These second weaving areas correspond to the surfaces of rotation formed by the non-parallel legs 144 and 146 of the trapezoid rotated about axis 106. Areas 138 and 140 are sloped radially inwardly with respect to first area 132. It is on areas 138 and 140 that the two dimensional weaving head capabilities are needed, for not only must the weaving heads move back and forth in an axial direction, but they must also move radially inwardly and outwardly along the sloped areas 138 and 140. It is on areas 138 and 140 that the cord lengths 142 are laid substantially parallel to one another for forming the sidewall sections. This parallel characteristic can be seen for the right surface 140 on FIG. 4A.

Third weaving areas 148 and 150 are provided for receiving the cord lengths 152 forming the bead sections right and left. These third weaving areas correspond to the portions of the drum cylinder 108 lying adjacent the bladder 110. It is on areas 148 and 150 that the bead sections are woven.

The method of weaving the component of the present invention can also be understood by tracing out the path followed by a single cord length in one complete weaving cycle with reference to FIG. 4B. A cycle is arbitrarily selected to begin at point 154 designated in FIG. 4B, although it is of course understood that the cycle can begin at any other point. The arbitrary selection of point 154 is not intended to limit the scope of this invention.

The weaving head, either 112 or 116, positions the cord 156 at point 154 of first weaving area 132 and lays down a length of cord 158 at an angle A (the cord angle) less than 90° to the edge 160 of the component to be formed. The edge 160 of the component is substantially aligned with the juncture 162 between weaving surfaces 132 and 140 as well as the juncture 164 between weaving surfaces 138 and 132. The cord length 166 is laid down across weaving area 132 towards opposing edge 168. Angle A is obtained by rotating weaving surface 100 in an appropriate timed relationship to the lateral motion of weaving head 112, just as is explained in the '456 patent. Surface 100 is preferably rotated at a constant velocity while the weaving is done for the tread section.

At juncture 164 between weaving area 132 and weaving area 138, the cord angle is changed to be substantially 90°, and a second length of cord 170 is laid down across weaving area 138, using the in and out as well as the back and forth capability of the weaving head, further towards edge 168. For weaving this portion, the timed relationship between the rotation of surface 100 and the lateral movement of the weaving head 112 is changed such that the surface 100 is substantially stationary while the weaving head 112 moves across the surface. Surface 100 is preferably stationary while weaving is being done in the sidewall sections.

Adjacent the juncture between weaving areas 138 and 148, a loop 172 of cord is laid down in a reversal 174 on the third weaving area 148 adjacent edge 168, and the cord is looped back towards edge 160, again with the appropriate timed relationship between the surface 100 and the weaving head 112. Surface 100 is stepped to give the turnaround or reversal at the edges.

A third length of cord 176 is now laid down back across weaving area 138 back towards edge 160 at a cord angle of substantially 90°. Adjacent juncture 164, the cord angle is changed back to A, although this time in an opposite orientation. Another cord length 178 is then laid down across weaving area 132 back towards beginning edge 160. Adjacent juncture 162, the cord angle is again changed to be substantially 90°, and a further length 180 of cord is laid down across weaving area 140. At weaving area 150, the loop 182 is laid down with reversal 184. Another cord length 186 is laid down back across area 140 to complete the cycle adjacent juncture 162.

It is understood that the weaving heads are moved back and forth and in and out only, while endless weaving surface 100 and areas 150, 140, 132, 138, and 148 are rotated or otherwise moved in timed relationship thereto. In the preferred embodiment of FIG. 4, surface 100 is rotated while the weaving heads are reciprocated in accordance with the general principles of '456 patent to Oswald. Controller 125 directs the motors 121, 122, and 123 in the appropriate timed relationship for the component being woven.

It is also further understood that endless weaving surface 100 need not be limited to a drum 108 with the toroid 110 imposed thereon, but could also be a belt such as that disclosed in '456 patent with a suitable toroidal shaped bladder mounted thereon.

The cycle described above is carried out repeatedly in conjunction with a mirror image left weaving head 116 with a second continuous cord. In this manner, the tire body reinforcing component of the present invention can be woven to a desired thickness.

The method of the present invention can also be understood by reference to only the top view of FIG. 3. The detailed schematics of FIGS. 4A and 4B become cumbersome when two cords are used. The component of the present invention can be illustrated by tracing out the pattern of the laying down of one cord reinforcement strip 36 and its mirror image counterpart 36' formed throughout one complete cycle. As shown from the top view of FIG. 3, weaving heads of the weaving device (not shown) position cord 36 at a reference position 38 adjacent one edge 44 of component 14, designated for convenience here as the beginning edge. It is understood that reference position 38 is chosen simply as a convenient reference, just as point 154 was chosen with respect to FIG. 4B, and that the weaving operation and resultant pattern could just as easily be described by beginning at some other point in the weaving cycle. The pattern of the mirror image cord 36' is described using the same figure numbers with prime marks.

The cord 36 is laid down substantially perpendicular to edge 44 and centerline 40 for a first predetermined distance 188 towards opposing edge 56. Distance 188 is chosen to correspond approximately to the width of the sidewall 16, and also corresponds to the width of the sidewall section 46 of the component 14.

After crossing the sidewall section, the angle A between the cord and edge 44 is changed to be less than 90°. The angle is typically referred to as the cord angle A. A second predetermined length of cord 190 is now laid down further towards opposing edge 56. This length 190 at cord angle A, which is preferably in the range of 15 to 35 degrees, corresponds to the width of tread section 42. It is understood that, in accordance with the teaching of the prior art, the laying down of cord 36 at various angles and lengths is accomplished by moving the weaving surface in the appropriate timed relationship to the weaving head that lays down cord 36.

After the appropriate second predetermined length 190 of cord 36 has been laid down across the width of the tread section 42, the cord angle is again changed to approximately 90° and a third predetermined length 192 corresponding to the width of second sidewall section 46' is laid down, thereby forming a portion of the second sidewall section 46'.

When opposing edge 56 is reached, cord 36 is looped around to reverse direction and thereby form loop 194 in the bead section 50'.

After cord 36 has looped around back towards edge 44, a length of cord 196 is laid down at a cord angle of 90° for a fourth predetermined distance, which corresponds to the width of sidewall section 46'.

When the cord 36 again reaches the tread section, the cord angle is changed to A; however, this time the cord 36 is inclined oppositely to length 48. A fifth predetermined length 198 is then laid down towards edge 40.

When cord 36 reaches the sidewall section 46, the cord angle is again changed to 90° to lay down a sixth predetermined length 200 to form another portion of sidewall section 46. Upon reaching edge 44, the cord is looped around to form a loop 202 for bead section 50. The cycle is now complete.

Repetitiously carrying out the cycle of cord 36, along with its mirror image cord 36', will result in the weaving of the reinforcing component of the present invention.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

I claim:

1. A tire body reinforcing component generally having a tire shape before being assembled into a tire and having sections corresponding to tread, sidewall, and bead regions of a pneumatic tire, said component comprising at least one continuous cord woven across the width of said component from one edge to the other thereof, said component having bead, sidewall, and tread sections for underlying the bead, sidewall, and tread regions respectively and extending along the circumferential direction of the tire wherein said continuous cord is disposed in a generally zig-zag pattern defining plural angles in each length of cord between the beads, said cord being positioned across the width of said tread section at a first angle to the edges of said component, the lengths of said cord in said tread section being interleaved with lengths disposed at a second angle to the edges of said component along at least one line substantially parallel to and intermediate the edges of said component, such that said lengths intersect in said tread section, for underlying the tread region of said tire, and said tread section being flanked on both sides by a side wall section, each said sidewall section being continuously and integrally made from the same cord forming the tread section, said sidewall section for underlying the sidewall region of said tire, the sidewall sections being in turn flanked by said bead sections, each of said bead section being further continuously and integrally made from the same cord forming the tread and sidewall sections, the bead sections being suitable for under lying and substantially forming the bead regions of said tire.

2. A pneumatic tire including the endless tire body component of claim 1.

3. A tire body reinforcing component, for a pneumatic tire, having a tread region, opposing sidewall regions, and opposing bead regions, said component comprising at least one continuous cord disposed across said component from one edge to the other thereof, said component having a tread section, two sidewall sections, and two bead sections, said tread section being substantially centered in said component, said sidewall sections flanking said tread section along both sides of said tread section, and said bead sections futher flanking said two sidewall sections, said tread section being adapted for underlying the tread region of said tire, said sidewall sections being adapted for underlying opposing sidewall regions of said tire, and said bead sections being adapted for underlying and substantially forming opposing bead regions of said tire, wherein (a) said tread section is formed by cord lengths forming a generally zig-zag pattern and being positioned across said tread section from one side to the other thereof at an angle to the edges of said component, the lengths between the sides of said tread section being interleaved with lengths disposed at an opposite angle to the edges of said component along at least one line substantially parallel to and intermediate the sides of said tread section;

(b) each said sidewall section is formed by cord lengths positioned across said sidewall section, said cord lengths being positioned along substantially radial lines with respect to each other across the sidewall section and substantially at right angles to the circumferential direction of the tire; and (c) each said bead section includes loops formed by looping cord lengths in reversals at the edges of said component, whereby a continuous, cord component is formed for underlying the bead, sidewall, and tread regions of said tire.

4. The component of claim 3, wherein the parameters of said tread section are $$\frac{C \cdot \tan \cdot A}{2 \cdot W} = \frac{EPI \cdot C \cdot D \cdot \sin A}{P \cdot M \pm 1} = GR$$

wherein

C is the circumference of the component,

A is the smaller angle between the cord and the edge of the component,

W is the width of the reinforcement measured perpendicular to the sides of said tread section, EPI is the number of cords per inch measured perpendicular to the cord lengths, P is an integer and equal to one plus the total number of interleaving lines parallel to and intermediate the sides of the tread section, M and D are two integers having no common factor and which render P·MA!1/D an integer with D being less than P, and D and P have no common factor, and GR is the number of repeating cycles of the cord from one side and back to the same edge for each circumference of the tread section.

5. A component according to claim 4, wherein A is in the range of 15 to 35 degrees.

6. The component of claim 3, wherein each said bead section further includes a plurality of cord lengths positioned substantially parallel to the circumferential direction of said component and adjacent to the edges of said component, whereby there is a buildup of cord material adjacent said edges to substantially reinforce the bead regions.

7. The component of claim 3, wherein each said loop comprises at least one reversal having an end length of cord extending substantially in the circumferential direction of the component adjacent said edges, and the size of at least selected ones of said end lengths being extended in said circumferential directions to extend the breadth of said loop and result in a buildup of cord material adjacent each said edge, said buildup being oriented in a circumferential direction, whereby the bead regions on both sides of said component are substantially reinforced.

8. The component of claim 3, wherein each said bead section further includes a plurality of cord lengths positioned substantially parallel to the circumferential direction of said component back from the edges of said component a predetermined distance, whereby there is a buildup of cord material in said bead regions to substantially reinforce said bead regions.

9. The component of claim 3, wherein successive ones of said loops are staggered with respect to said edge to form an edge wherein said reversals lie in a relatively uneven line, whereby the forces that tend to be focused toward the edge of said component are distributed over a portion of said bead regions rather than concentrated at the edges of said component.

10. A component according to claim 3 wherein the continuous cord is covered with rubber.

11. A component according to claim 3 wherein each cord includes steel.

12. A component according to claim 3 wherein each cord includes an aramid.

13. A component according to claim 3 comprising at least two continuous, interwoven cords.

14. A pneumatic tire including the component of claims 3, 4, 6, 7, 8, 9, 10, 11, 12, 5, or 13.

15. A method of producing a tire body reinforcing component for a pneumatic tire which comprises forming at least one continuous cord in a pattern extending across the width of said component from one edge to the other thereof by:
   (a) forming a tread section by positioning said cord in a generally zig-zag pattern across the width of said tread section from one side to the other at an angle to the edges of said component, the lengths of said cord between sides of said tread section being interleaved with lengths disposed at an opposite angle to the edges of said component along at least one line substantially parallel to and intermediate the sides of said tread section;
   (b) further forming from said continuous cord two sidewall sections integrally made with said tread section, each said section flanking said tread section along both sides thereof, said cord in each said sidewall section being positioned across the sidewall section and substantially perpendicular to the circumferential direction of the tire; and
   (c) further forming from said continuous cord two bead sections integrally made with said sidewall and tread sections by looping the cord in reverse directions at the edges of said component, whereby a continuous, cord component is formed for underlying the beads, sidewalls, and tread of said tire.

16. The method of claim 15, wherein the parameters of the tread section are formed in accordance with the following relationship:

$$\frac{C \cdot \tan \cdot A}{2 \cdot W} = \frac{EPI \cdot C \cdot D \cdot \sin A}{P \cdot M \pm 1} = GR$$

wherein
C is the circumference of the component,
A is the smaller angle between the cord and the edge of the component,
W is the width of the reinforcement measured perpendicular to the sides of said tread section,
EPI is the number of cords per inch measured perpendicular to the cord lengths,
P is an integer and equal to one plus the total number of interleaving lines parallel to and intermediate the sides of the tread section,
M and D are two integers having no common factor and which render P·M±1/D an integer with D being less than P, and D and P have no common factor, and
GR is the number of repeating cycles of the cord from one side and back to the same edge for each circumference of the tread section.

17. A method of producing a tire body reinforcing component for a pneumatic tire which comprises forming at least one continuous cord in a woven pattern on a shaped endless forming surface across one edge to the opposing edge of said component, said shaped endless forming surface having a cross-sectional shape defining a plurality of forming areas thereacross, said shape corresponding to that of a cylinder having a raised portion extending uniformly around the face of said cylinder between the ends of said cylinder, said raised portion having a shape corresponding to the surface of rotation obtained by positioning the major parallel leg of a trapezoid on said cylinder face and rotating said trapezoid about the cylinder axis, the surface of rotation corresponding to the minor parallel leg forming a first forming area for receiving cord lengths forming a tread section of the component, the surfaces of rotation corresponding to the nonparallel legs of said trapezoid forming second foming areas right and left for receiving cord lengths forming right and left sidewall sections of the component, and the cylindrical face portions on either side of said raised portion forming third forming areas right and left for receiving the cord lengths forming right and left bead sections of the component, the shape of said raised portion approximating the cross-sectional shape of a pneumatic tire for which the component is intended, said method being carried out in accordance with the cyclical repetition of the following steps:
   (a) positioning said cord at a preselected reference position on said first forming area and laying down a length of said cord at an angle of A less than 90° to said edge towards the opposing edge across said first forming area;
   (b) changing the angle between the cord and said edge to be substantially 90° to said edge and laying down a further length of said cord across one of said second weaving areas towards the opposing edge;
   (c) laying down a looped length of said cord on one of said third forming areas in a reversal at said opposing edge back towards the beginning edge;
   (d) laying down a further length of said cord back across said one of said second forming areas back toward said beginning edge at an angle of substantially 90° to said edge;
   (e) changing the angle between the cord and said opposing edge to angle A and laying down a further length of said cord across said first forming area back toward the beginning edge at an angle A to said edge, said angle A being oppositely disposed with respect to said other length on said first weaving area;
   (f) changing the angle between the cord and said edge to be substantially 90° to said edge and laying down a further length of said cord across the other one of said second weaving areas;
   (g) laying down a looped length of said cord on the other one of said third forming areas in a reversal at said beginning edge back towards the opposing edge; and
   (h) laying down a further length of said cord across the other one of said second weaving areas back to said first weaving area at an angle to the edge of substantially 90°;

and repeatedly carrying out said steps in a cyclical fashion to form said component on said endless forming surface to a desired thickness.

18. The method of claim 21, wherein two continuous cords are disposed in the pattern across the width of said component in accordance with the cyclical repetition of steps (a)-(h), the two cords bearing formed in substantially mirror images of each other.

19. Apparatus for forming a endless tire cord component for underlying the tread, sidewall, and bead regions of a pneumatic tire, from at least one continuous cord reinforcement, said apparatus comprising:
 (a) a shaped endless fomring surface having a cross-sectional shape defining a plurality of forming areas thereacross, said shape corresponding to that of a cylinder having a raised portion extending uniformly around the face of said cylinder between the ends of said cylinder, said raised portion having a shape corresponding to the surface of rotation obtained by positioning the major parallel leg of a trapezoid on said cylinder face and rotating said trapezoid about the cylinder axis, the surface of rotation corresponding to the minor parallel leg forming a first forming surface for receiving cord lengths forming a tread section of the component, the surface of rotation corresponding to the non-parallel, legs of said trapezoid forming second forming areas right and left for receiving cord lengths forming right and left sidewall sections of the component, and the cylindrical face portions on either side of said raised portion forming third forming areas right and left fo receiving the cord lengths forming right and left bead sections of the component, the shape of said raised portion approximating the cross-sectional shape of a pneumatic tire for which the component is intended, said surface being rotatable about said axis;
 (b) reinforcement guide means for supplying cord reinforcement to said endless forming surface;
 (c) means for continuously rotating said surface about said axis;
 (d) means for reciprocating said guide means in a timed relationship both back and forth along a path parallel to said axis and in and out along a path perpendicular to said axis to effect the laying of said cord reinforcement on said surface in a predetermined pattern.

20. Apparatus according to claim 19, wherein said endless forming comprises a toroidal shaped, reinforced bladder having a toroidal trapezoidal cross-sectional slipped over a cylindrical weaving drum.

21. Apparatus according to claim 20 which further includes a means for synchronizing the rotation of said forming surface with the reciprocation of said guide means.

* * * * *

Disclaimer 4,830,781.—*Richard W. Oswald*, Madison, Conn. TIRE BODY REINFORCING COMPONENT AND APPARATUS AND METHOD FOR PRODUCING SAME. Patent dated May 16, 1989. Disclaimer filed Feb. 20, 1991, by the assignee, Pirelli Armstrong Tire Corp.

Hereby enters this disclaimer to claims 1-7, 10-13, 15 and 16 of said patent.
[ *Official Gazette April 30, 1991* ]